Sept. 20, 1966   R. J. MULLIGAN ET AL   3,274,491
INDICATING METER COMBINED WITH ADJUSTABLE COUPLED COILS
WHICH ARE SELECTIVELY DECOUPLED BY A
POINTER SUPPORTED VANE Filed Sept. 29, 1961

INVENTORS
Robert J. Mulligan
Harry C. Quick, Jr.
BY Peck & Peck
ATTORNEYS

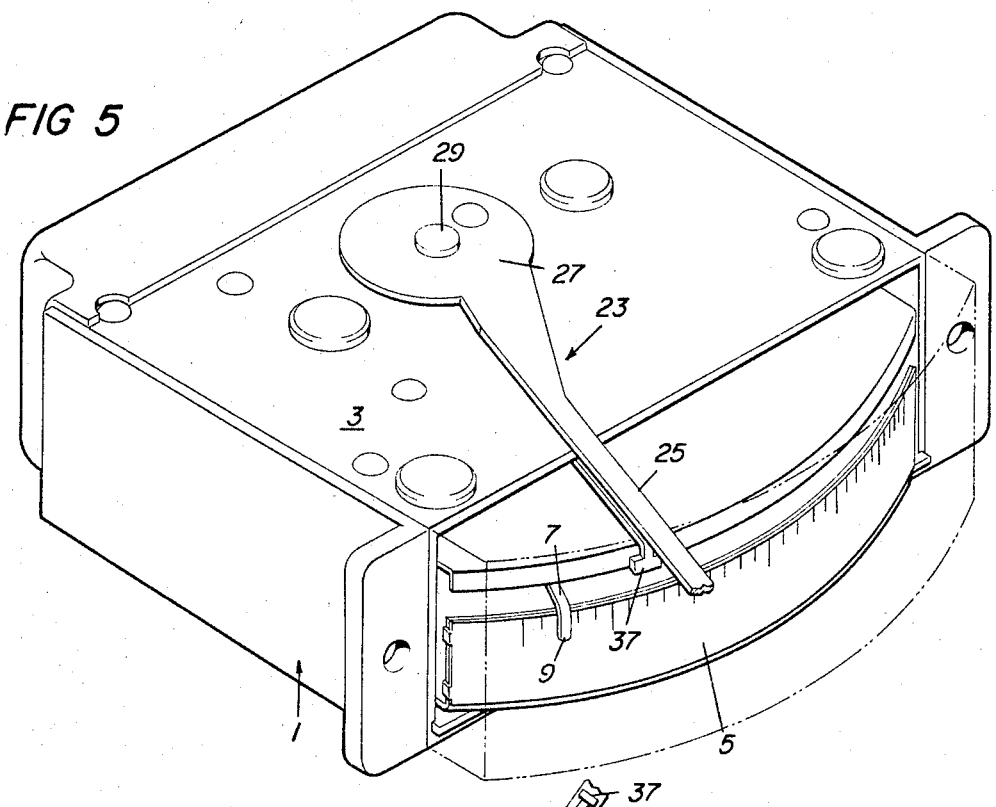
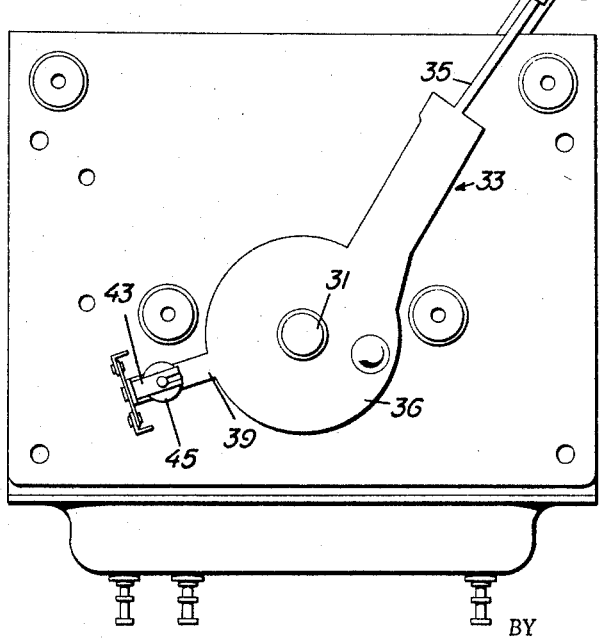

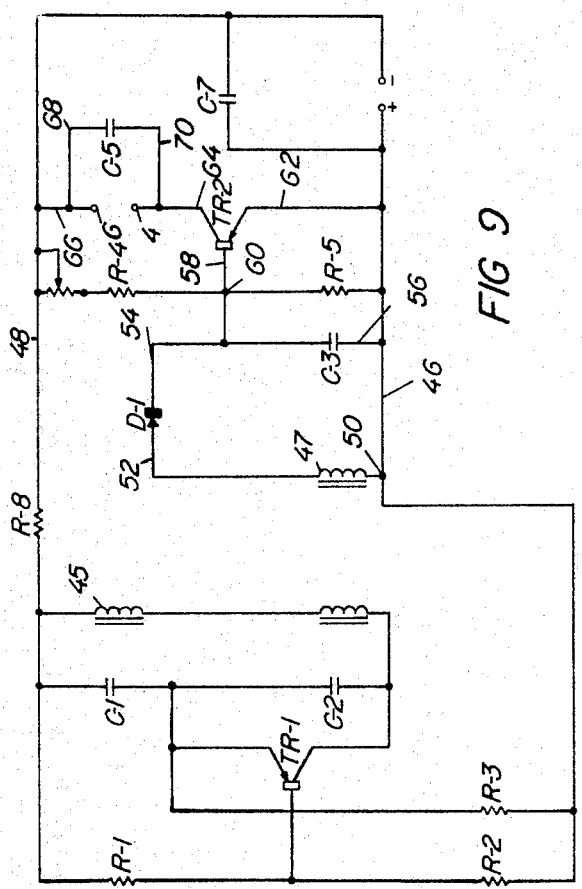
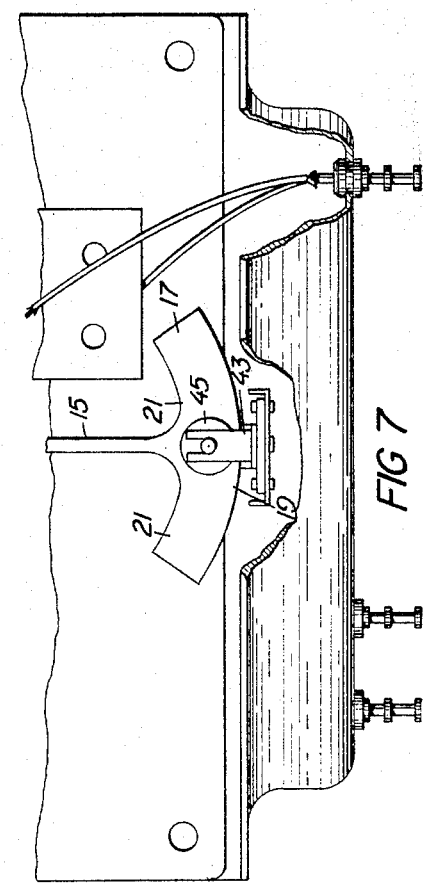
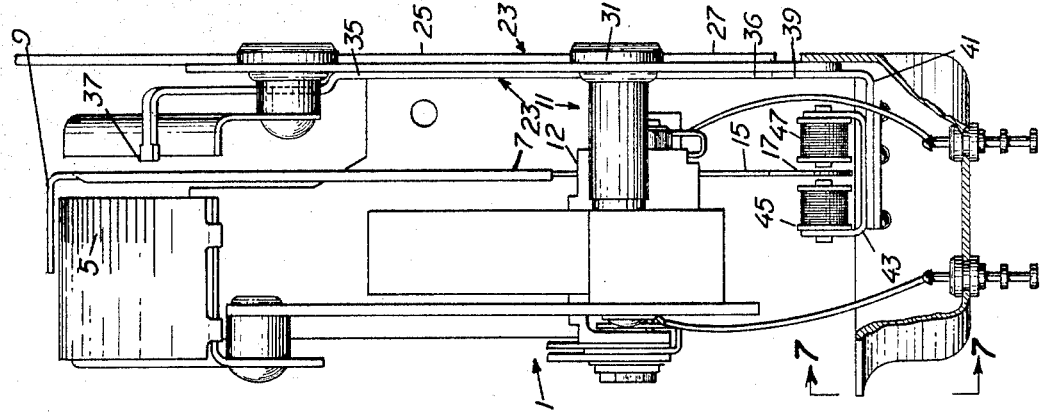

Sept. 20, 1966  R. J. MULLIGAN ET AL  3,274,491
INDICATING METER COMBINED WITH ADJUSTABLE COUPLED COILS
WHICH ARE SELECTIVELY DECOUPLED BY A
POINTER SUPPORTED VANE
Filed Sept. 29, 1961  6 Sheets-Sheet 5

Inventors
Robert J. Mulligan
Harry C. Quick, Jr.
by Peck & Peck
attorneys

United States Patent Office 3,274,491
Patented Sept. 20, 1966

3,274,491
INDICATING METER COMBINED WITH ADJUSTABLE COUPLED COILS WHICH ARE SELECTIVELY DECOUPLED BY A POINTER SUPPORTED VANE
Robert J. Mulligan, Hamden, and Harry C. Quick, Jr., Weston, Conn., assignors to International Instruments, Incorporated, Orange, Conn., a corporation of Connecticut
Filed Sept. 29, 1961, Ser. No. 141,869
3 Claims. (Cl. 324—157)

This invention relates broadly to the art of meter controlling, and in its more specific aspects it relates to a control meter which indicates full scale, yet controls at a set point; and the nature and objects of the invention will be readily recognized and understood by those skilled in the art to which it relates in the light of the following explanation and detailed description of the accompanying drawings illustrating what we at present believe to be the preferred embodiment or mechanical expressions of our invention from among various other forms, arrangements, combinations and constructions, of which the invention is capable within the spirit and scope thereof.

It is conventional practice in the art of meter controlling to provide a set point arm carrying two electromagnetically coupled coils and to attach a metallic vane to the meter pointer. When the vane passes between the coils, a switching action is initiated (such, for instance, as a relay being energized) and when the vane has passed through the coils, the switching action returns to its normal idle condition. Thus, in prior art meters of the general character with which we are concerned, this control or switching action occurs only at a set point, and above or below the control point the control condition is the same and the switching action returns to its normal idle condition.

The aforementioned conditions and results are highly undesirable. As an example, if a relay which is controlled by the meter controls the operation of an oven, heat would be applied up to the set point and at the set point the application of heat would be stopped. Now if the meter pointer travelled upscale beyond and outside the set point, which is possible with fast heating response, the heat would again be applied to the oven, thus in this situation it will be apparent that essentially the controller is useless.

The prior art in order to avoid, overcome and solve this undesirable situation has usually prevented the meter pointer from traveling outside the control area as determined by the position of the set point arm and its pair of coils, by fixing a stop on the set point in the path of travel of the meter pointer.

It will be evident that this prior art attempted solution is disadvantageous for the reason that the meter pointer cannot travel outside the control area to indicate temperature beyond the control area.

We have overcome this inherent disadvatnage, and others, which are inherent in prior art control meters, by devising a control meter which will indicate full scale yet will control at a set point. The control meter which we have developed is not only desirable and advantageous in the type of systems mentioned in the example above, but its usefulness also enhances the design and operation of many other systems.

The control meter of this invention controls and indicates full scale yet the unit is not able to get out of phase, and this is the fact regardless of power failure to the control system or signal system. When power is restored the same relation must exit.

Experience in this field shows that prior to this invention there has a definite lack in the art of meter controlling of a contactless controller which can control at a set point yet is so designed that the meter will control at a set point yet the meter point is capable of full scale indication.

In solving the problems briefly outlined above we have provided a simple yet highly efficient, mechanical arrangement and novel disposition of components, which does not reduce the operational efficiency of the meter, and does not add to the cost of production and assembly thereof.

In devising the novel arrangement whereby we achieve many highly advantageous results which have been heretofore unobtainable, we have provided a shielding vane on the meter pointer which is so configured and fixed thereon relative to the coils on the set point arm, that the sensing coils continue to remain shielded even after the meter pointer moves through the set point arm so that the swtiching action will not then return to its normal condition. We have also mounted the vane on the meter needle so that pointer deflection is not limited in any manner whatsoever and the entire assembly makes it possible to obtain a control function which is off up to the set point and on at any place past and beyond the set point, or is on up to the set point and off at any place past and beyond the set point, to thereby obtain the desired results from the control meter.

We have fixed the vane, which passes between and shields the coils, on the meter needle disposed thereon to the rear of the meter movement center, and we have found that this relationship of these components is of substantial advantage in the the entire assembly and the proper functioning thereof. For instance, the positioning of the vane on the pointer to the rear of the movement center relieves the moving coil system from the added weight of the vane and the vane fixed as we propose substitutes for conventional tail weights which have been heretofore necessary to balance the pointer end. It should also be recognized that were the vane placed forwardly of the meter movement center, the weight of the vane plus the weight of the pointer would have to be counterbalanced by tail weights and, of course, this would substantially add to the over-all weight. The relative positioning of the vane on the meter pointer and the coils on the rear of the set point arm also provides greater freedom of movement and eliminates the space limitations involved in fixing the vane in the front center of the movement.

It has also been one of our purposes to provide a system which permits using a vane of relatively lightweight. This is accomplished by reducing the thickness of the vane to a minimum for the function it must perform, and we have found that our design of vane provides as steep an angle to the control output as is possible.

In accomplishing our prime object of indicating at full scale while controlling at a set point, we have provided one or more set point arms which carry on their ends to the rear of the meter movement center a pair of electromagnetically coupled coils between which the vane on the meter pointer is adapted to pass, and we have offset the coils relative to the set point arm. We have found that for the majority of control purposes the coil arm which carries the coils and which projects rearwardly from the set point arm is offset from the coil arm at an angle thereto which is one-half the meter scale arc. In this connection it is to be clearly understood that for special control purposes we may vary the angle the coil arm is offset with respect to the set point arm from one-half the scale arc and the control meter will still fall within the spirit and scope of this invention.

This invention also contemplates and provides means which enhances its operation with null indicators where the normal zero position of the meter pointer is half scale. This form of our invention provides an arrangement wherein a small deviation to the left or right of the null point will result in a rise in output.

The apparatus of this invention also provides means whereby the polarity discriminating output may be obtained. This, it will be recognized, is highly advantageous in any type of servo drive where motor direction is determined by output polarity.

The device which we have devised assures operational sequencing, continuous output beyond the set point or control point since the meter pointer is not limited by stops at the control points and the vane continues to shield the coils as the pointer continues upscale. Furthermore, our control meter output can provide one polarity signal, one polarity variable null band, a polarity discriminating output and a polarity discriminating output with variable null band.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

FIG. 5 is a view in perspective of a control meter involving the features of this invention.

FIG. 6 is a vertical sectional view through the meter of FIG. 5.

FIG. 7 is a view taken on line 7—7 of FIG. 6.

FIG. 8 is a bottom plan view of the set arm and coil arm, with parts of the control housing removed.

FIG. 9 is a diagram of a circuit which may be used to produce the change in voltage for the devices disclosed in FIG. 1.

Figure 1:
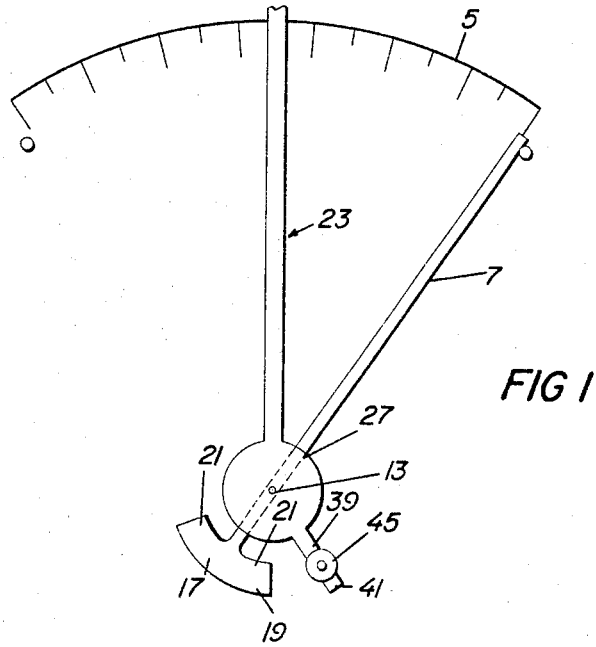
FIG. 1 is a diagrammatic view of one form of device showing the set point arm set at half scale and the meter pointer at the zero scale point.
Figure 2:
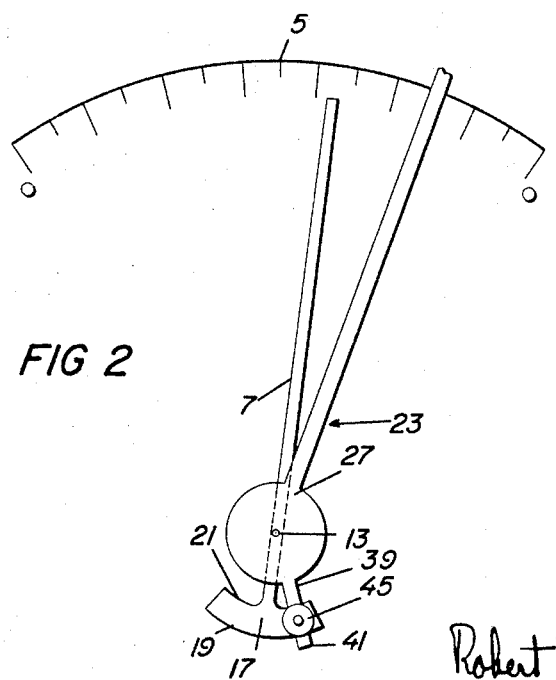
FIG. 2 is a diagrammatic view of the device of FIG. 1 with the set point arm set down scale from the half scale point of FIG. 1 and the meter pointer moved up scale beyond the set point and with the vane extended between the coils.

In the accompanying drawings, and particularly FIGS. 1, 2, 5, 6 and 7 thereof, we have disclosed a control meter designated generally by the reference numeral 1 and comprising any suitable type of housing 3, provided at one end with an exteriorly visible scale 5, and including the meter pointer 7 having the scale traversing nose 9 at one end thereof, which pointer and nose project through a slot or opening in the meter housing so that the nose will be visible from the exterior of the housing, all as is well known in this art. The moving coil assembly which may be of any suitable type which is conventional in the art we have designated in its entirety by the numeral 11 and we mount the pointer 7 on this moving coil assembly as at 12 to be moved thereby, the pointer being mounted in any suitable manner for controlled movement by the coil assembly. The moving coil assembly represents the meter movement center and in FIGS. 1 and 2 of the drawings we have used the numeral 13 to designate the movement center. The pointer 7 is formed with an extending tail portion 15, which extends to the rear of the movement center 13 and on its rear end carries a vane 17, of elongated curved construction, the tail portion 15 of the pointer joining the vane medially of the ends thereof. The rearmost side edge 19 of the vane has a constant radius of curvature as do the forward edges 21 thereof which extend from the jointure point of the tail portion of the pointer with the vane.

The control meter assembly includes a set point arm assembly designated generally by the reference numeral 23, which set point arm comprises a forwardly extending portion 25 which extends forwardly over and above the scale 5 and, as will become apparent as this description proceeds, provides the manually settable means of the device. The forwardly extending portion 25 terminates at its rear in a disc 27 which is pivotally mounted as at 29 on a pivot element 31 which is positioned at the center of the meter movement. Thus, the set point arm may be swung on its pivot to any desired position relative to the scale 5. As will be readily apparent from the drawings, it is preferable, though not necessary, that the set point arm is mounted on the exterior of the meter housing. In any event, it is necessary that at least a part of the portion 25 is accessible from outside the housing for manual positioning of the set point arm in the desired, predetermined scale position.

We provide what we shall term a "coil arm assembly" which in effect, and as will be described, forms a part of and moves or swings with the set arm 23. The coil arm assembly we have designated generally by the numeral 33, and includes a forward arm portion 35 terminating at its forward end in a downwardly bent nose or set point indicator 37. The coil arm assembly 33 includes a disc 36 which is mounted on pivot element 31 so that when set point arm 33 is manually swung to a predetermined position, coil arm assembly 33 will swing in unison therewith. The coil arm assembly includes a rearwardly extending coil portion 39 which terminates in an inwardly bent coil support arm 41 which mounts by means of a bracket 43, a pair of spaced electromagnetically coupled coils 45 and 47.

The rearwardly extending portion 39 extends from the disc 36 at an offset with respect to arm 35, and in this example such offset is at an angle of 35° so that the coils 45 and 47 will be mounted at this 35° angle with respect to arm 35 and also with respect to set point arm 23 since these two arms are aligned and move or swing together.

In the example of FIGS. 1, 2, 5, 6 and 7 the arc of the scale 5 is 70° and the coils are offset from the arm at a 35° angle and the vane 17 has been dimensioned to cover the area as described by a 70° arc from the center. Now, it is to be understood that the set point arm may be set at any predetermined point on the scale where it is desired for the control to be initiated, and as the pointer 7 moves up the scale toward the set point arm, the vane 17 will move towards the control area between the coils, and as the pointer becomes aligned with the set point arm, the forward end of the vane will be between the coils and the control function initiated and the pointer may move fully up the scale to indicate full scale or beyond the set point arm and the vane will continue to shield the coils so that the control function will operate for the full scale length, if desired.

In this particular form of our invention the angle of offset of the coils is one-half the scale arc and the vane is of a length to cover the area as described by an arc from the movement center which is equal to the scale arc. Thus, the relationship of the arms, vane and coils is determined by the scale arc, and the offset of the coils and the length of the vane being determined by the scale arc permits a control function which is off up to the set point and on at any place past the set point so that the pointer is capable of full scale indication.

As pointed out above, it is within our contemplation to vary the angle of offset of the coils from that mentioned above for certain special control purposes. It is, of course, within our contemplation to have the control function on up to the set point arm and off beyond it. It will be clear that this may be accomplished merely by reversing the position of portion 39 and the coil assembly so that in the position of pointer in FIG. 1 the vane would extend between the coils.

The devices of this invention may involve controllers which are semi-conductor switching devices wherein the output is shown as a change in voltage and we have shown a single output polarized circuit to produce this change in voltage in FIG. 9 of the drawings.

The circuit of FIG. 9 which may be used to produce the voltage change for the device of FIG. 1 involves a Colpitts type oscillator consisting of a transistor TR1, resistors R1, R2 and R3, condensers C1 and C2, and the coils 45 and 47. Power to operate the oscillator is supplied by a 22½ volt power source.

The amplifier circuit includes leads 46 and 48 from the input terminals. The pick-up coil 47 is connected at 50 to lead 46 and to diode D1 by conductor 52. A capacitor C3 is connected to diode D1 by conductor 54 and to lead 46 by conductor 56. A transistor TR2 is connected by conductor 58 to conductor 54 and a resistive network extends between leads 46 and 48 and comprises resistors R4 and R5, this network being connected to conductor 58 at 60. A conductor 62 connects TR2 to lead 46 and a conductor 64 connects the transistor TR2 to load terminal 4. Load terminal 6 is connected to lead 48 by conductor 66 and to a capacitor C5 by conductor 68. A conductor 70 connects capacitor C5 with conductor 64. Capacitor C7 which is connected across input lines is employed to by-pass any A.C. component around the power supply.

When the circuits are placed in operation, the oscillator will furnish power to coil 45 which is magnetically coupled to coil 47 so that a voltage will be induced in coil 47. The voltage from coil 47 is fed through diode D1. The diode is simply a rectifier and permits the passage of only the positive portions of the voltage fed to it by coil 47 to pass through to condenser C3. The condenser charges to a positive value sufficient to exceed the negative potential which would otherwise be present at this point due to the resistor network R4 and R5. This positive potential is also applied to the base of transistor TR2 causing the transistor to swing to its non-conducting or minimum conducting state, depending on the magnitude of positive charge being applied to its base. The current in the collector circuit designated by output 4 and 6 would be a minimum, when the base is biased as outlined above.

Upon the positioning of the metal vane 17 between coils 45 and 47, the magnetic coupling is disturbed in such a manner as to reduce the voltage induced in coil 47 by coil 45 which is coupled to it. This lowering or reduction in the voltage obtainable from coil 47 results in a lowering of the positive charge on condenser C3 to a point below the negative potential being introduced by the resistor network R4 and R5. This changes the bias on the transistor TR2 base from a positive charge to a negative charge, thereby causing the transistor TR2 to swing from a non-conducting or minimum conducting state to a conducting state so that current flow in the output circuit will be increased from a minimum to a maximum, the degree of increase, of course, being determined by the reduction in voltage from coil 47. This resultant change of output from a minimum to a maximum as the vane is passed between the coils, is utilized to actuate, for instance, a relay.

As one example, the value of the components of FIG. 9 may be:

| | |
|---|---|
| R4 | 30K. |
| R5 | 3.9K. |
| C1 | .005 mfd. |
| C2 | .00068 mfd. |
| 45 | 600T 40 wire. |
| 47 | 600T 40 wire. |
| TR1–TR2 | Transistor 2N652. |
| D1 | Diode–IN66A. |
| R1 | 6.8K. |
| R2, R3 | 1K, 2.2K. |
| C3, C5, C7 | .02 mfd. |

Figure 3:
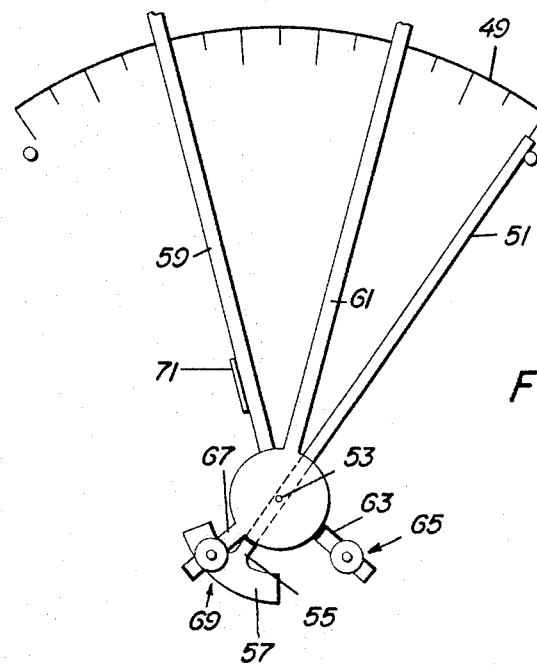
FIG. 3 is a diagrammatic view of another form of our device which comprises two set point arms each of which carries a set of electromagnetically coupled coils.

In FIG. 3 of the drawings we have illustrated another form of our invention and have used the reference numeral 49 to indicate the scale of the meter and the numeral 51 to indicate the meter pointer. In this form of our invention as in the previously described form the pointer is mounted on the meter movement center 53 and on the moving coil assembly 11 (of FIG. 6) and includes a tail portion 55 mounting a vane 57 which is the same as vane 17 of FIGS. 1 and 7.

In this form of our invention we provide two set point arms 59 and 61 each of which is of the same construction as set point arm 23, and include the coil arm assembly 33, all of which have been described in connection with the previously described form of the invention. The arm 59 includes a rearwardly extending portion 63 which mounts a pair of electromagnetically coupled coils designated generally by the numeral 65, while the arm 61 includes a rearwardly extending portion 67 which mounts a pair of electromagnetically coupled coils designated generally by the numeral 69. It will be understood that the coils 65 and 69 are mounted on the coil arm assemblies in the same manner as are coils 45 and 47 described in connection with the arrangement of FIGS. 1, 6 and 7, and it is to be further understood that arms 59 and 61 are independently movable so that coils 65 move with arm 59 independently of coils 69 and arm 61. It is also to be understood that coils 65 are offset from arm 59 at an angle approximately one-half the arc of scale 49 and vane 57 is dimensioned to cover the area as described by an arc from the center equal to the scale arc. Arm 59 carries an arm overlap 71 to prevent either of the arms from passing the other arm.

The device illustrated in FIG. 3 provides two pairs of electrically independent coils and the relation of outputs from the two pairs of coils is completely independent. For instance, if the set point arm 61 is set at 20% of the scale, the output will be on until pointer 51 reaches this set point arm or 20% of the scale, whereupon it will drop out and stay out for complete travel up to 100% of the scale. If set point arm 59 is set, for instance, at 60% of the scale, its output will be off till pointer reaches 60% of the scale and stay on till 100%. Thus, with the set point arms set apart there is complete control independence one from the other.

It should also be noted that if pointer 51 is in the scale center between the set point arms, when the set point arms are set over each other, the function of the pointer when it travels up or down scale would be to shield one set of coils and not the other and this would initiate control action for a slight deviation of the pointer off center and would provide also a sense of deviation.

The form of the device of FIG. 3 enhances operation for null indicators. When in dead center there is null band where neither set of coils is totally shielded and it is of value to have a null band where hunting of processes can be eliminated. The circuitry of FIG. 10 may be used with the device of FIG. 3 or the circuitry of FIG. 11 may be used.

Figure 4:
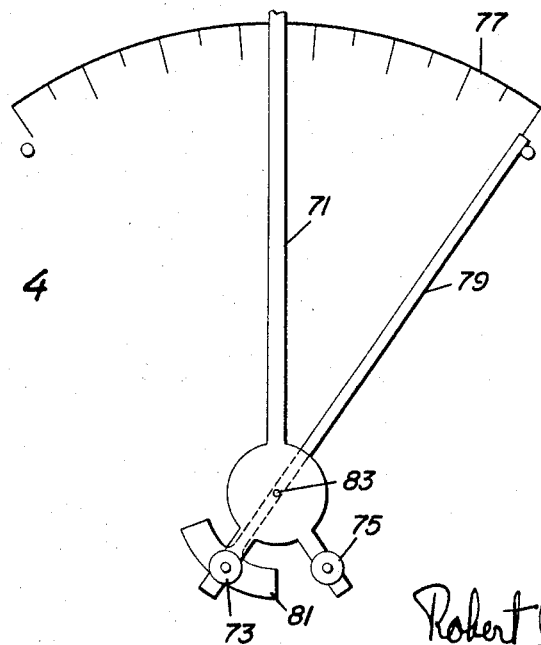
FIG. 4 is a diagrammatic view of yet another form of our invention wherein one set point arm is provided which carries two pairs of coils which are in spaced relation.

FIG. 4 diagrammatically discloses another form which our invention may take. Here we provide a single set point arm 71 which is operatively mounted in the manner hereinbefore described. However, this single set point arm mounts two pairs of coils 73 and 75, one pair being offset in one direction from the arm at an angle one-half the arc of the scale 77, while the other pair is offset in the opposite direction from the arm at an angle one-half the arc of the scale. The meter pointer 79, vane 81 and meter movement center 83 are all the same and mounted and arranged the same as previously described.

The device of FIG. 4 provides one set point arm mounting two pairs of sensing coils. With this form of our invention we use the circuit of FIG. 10 for two polarized outputs or FIG. 11 to obtain a polarity discriminating output. This output is highly advantageous in any type of servo drive where motor direction is determined by output polarity.

Figure 11:
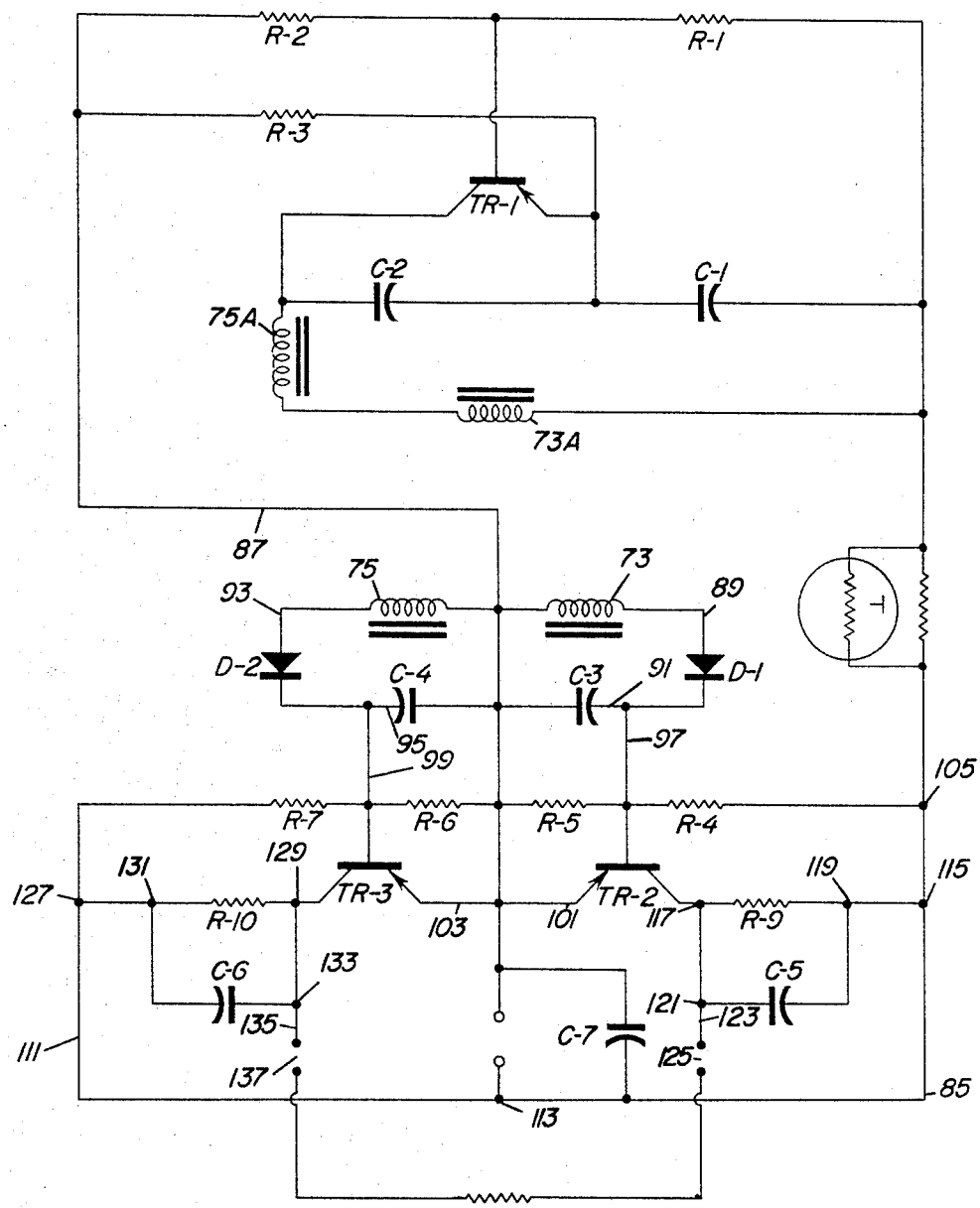
FIG. 11 is a diagram of a circuit which may be used to produce the change in voltage for the device disclosed in FIG. 3 to provide a variable null non-polarized output and in FIG. 4, to provide a fixed null, non-polarized output.

In FIG. 11 we show a Colpitts transistor oscillator circuit which comprises resistors R1, R2, R3, transistor TR1, condensers C1 and C2 and oscillator coils 73A and 75A which supply supersonic energy to pick-up coils 73 and 75. Power is supplied to the oscillator circuit from input lines 85 and 87 which also power the control circuit.

The control circuit is connected to the input leads 85 and 87 and includes the pick-up coils 73 and 75, the coil 73 being connected to rectifier D1 by conductor 89, and the rectifier D1 being connected to capacitor C3 by conductor 91. The pick-up coil 75 is connected to rectifier D2 by conductor 93 and capacitor C4 and rectifier D2 are connected by conductor 95. Lead 97 connects a transistor TR2 between rectifier D1 and capacitor C3 while a lead 99 connects a transistor TR3 between rectifier D2 and capacitor C4. The transistors TR2 and TR3 are connected to lead 87 by conductors 101 and 103, respectively. A resistive network is provided comprising resistors R4 and R5 which are connected to power lead 85 at 105 and to conductor 97 at 107 and to lead 87 at 109 and a further resistive network is provided comprising resistors R6 and R7 which are connected at one end to terminal 109 and at the other end to lead 111 which is connected at 113 to input lead 85. A load resistor R9 is connected at 115 to lead 85 and at 117 to TR2. We provide a capacitor C5 connected at 119 to one end of resistor R9 and connected at terminal 121 to conductor 123 which connects load terminal 125 with terminal 117. A similar load resistor R10 is incorporated in the coil 75 circuit being connected at 127 to lead 111 and at 129 to TR3 and a capacitor C6 is connected at 131 to resistor R10 and connected at terminal 133 to conductor 135 which connects load terminal 137 with terminal 129. The load is schematically illustrated and is connected across terminals 125 and 137. Capacitors C5 and C6 are included to by-pass any A.C. component around the load resistors R9 and R10. Capacitor C7 which is connected across input lines is employed to by-pass any A.C. component around the power supply.

This circuit of FIG. 11 is that illustrated and described in my pending patent application Serial No. 858,256, filed December 8, 1959.

Figure 10:
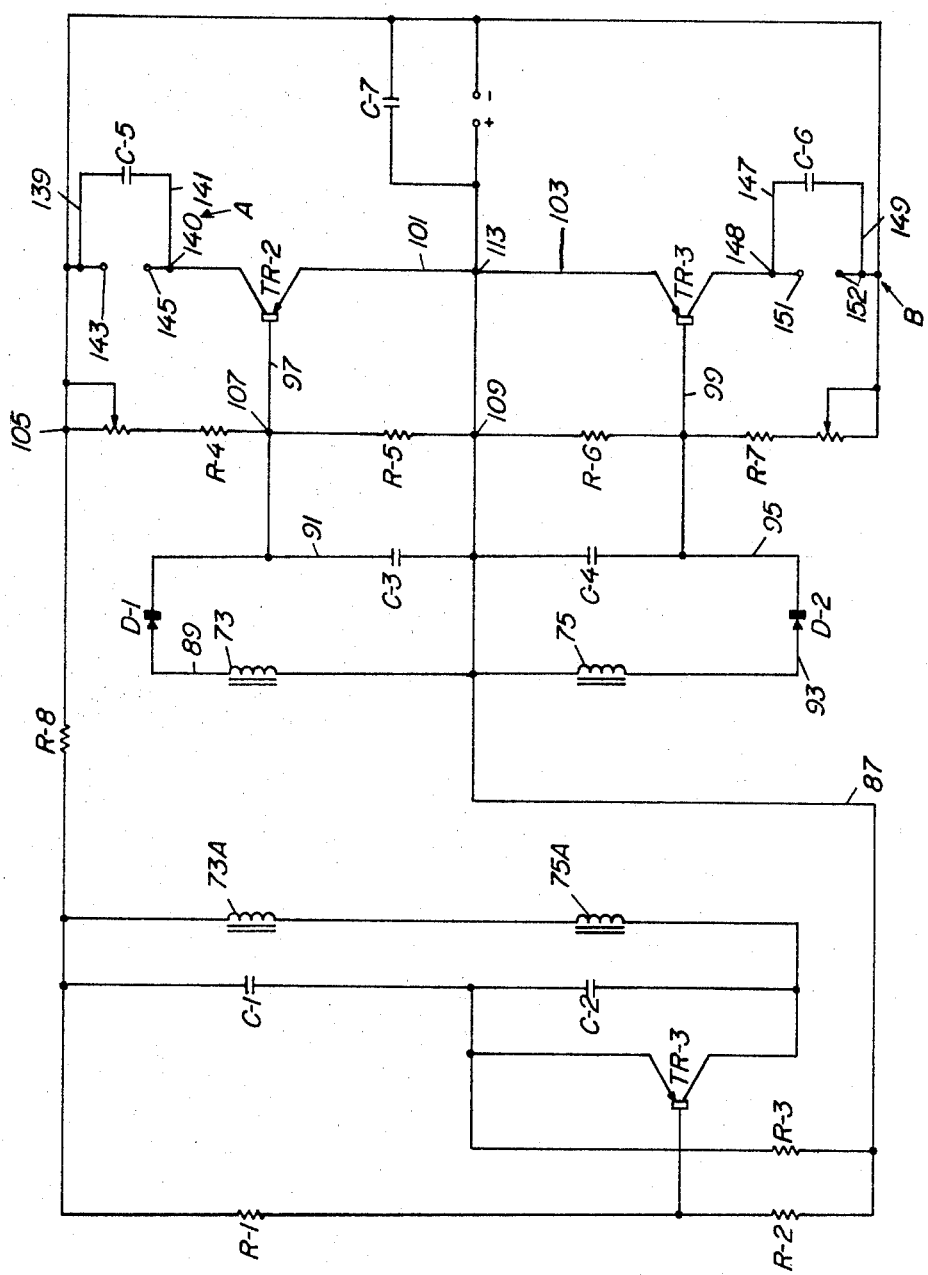
FIG. 10 is a diagram of a circuit which may be used to produce the change in voltage for the devices disclosed in FIG. 3 and FIG. 4 to provide two polarized outputs.

The circuit diagram illustrated in FIG. 10 provides two polarized outputs and may be used to produce voltage change for the devices disclosed in FIGS. 3 and 4.

In FIG. 10 we have used the same reference numerals as used in FIG. 11 for the same components. In the circuit of FIG. 10 we provide two polarized outputs, A and B, the output A comprising load terminals 143 and 145. A capacitor C5 is connected across said load terminals by conductors 139 and 141 and transistor TR2 is connected to conductor 141 at 140. The output B comprises load terminals 151 and 152, a capacitor C6 being connected across said load terminals by conductors 147 and 149 and transistor TR3 is connected to conductor 147 at 148. The remainder of the circuit of FIG. 10 is the same as that of FIG. 11.

We claim:

1. A control meter, including in combination, a meter movement and a scale, a meter pointer supported on and moved by said meter movement, said meter pointer including a portion extending forwardly from said meter movement and adapted to traverse and indicate over the full scale, and said meter pointer including a rearwardly extending portion from said meter movement which is aligned and movable with said forwardly extending position, a vane fixed on said rearwardly extending portion and said vane being elongated in a direction generally perpendicular to the longitudinal axis of said rearwardly and forwardly extending portions of said meter pointer, and a set point arm assembly pivotally mounted at the center of said meter movement and independently movable relative to said meter pointer, said set point arm assembly having a forwardly extending portion terminating adjacent said scale for manual adjustment to predetermined points on the scale, and said set point arm assembly including a rearwardly extending portion movable with the forwardly extending portion thereof, said rearwardly extending portion of the set point arm assembly being offset with respect to the longitudinal axis of the forwardly extending portion thereof, a pair of spaced electromagnetically coupled coils fixed on the rearwardly extending portion of said set point arm assembly positioned for travel of said vane therebetween, the offset of said rearwardly extending portion of said set point arm assembly relative to the forwardly extending portion thereof and the dimensions of the vane being such that the vane will be positioned between and shielding the coils from the time the meter pointer reaches and is aligned with the forwardly extending portion of said set point arm assembly in its indicating travel of the scale and also said vane will be positioned between and shielding both of said coils during its indicating travel from its position in alignment with the set point arm to a full scale indication, whereby a control function is in one condition until the meter pointer reaches and is aligned with the forwardly extending portion of said set point arm assembly in its indicating travel of the scale, and is in the opposite condition in its further travel of the scale beyond said aligned position of the meter pointer with the forwardly extending portion of said set point arm assembly.

2. A control meter including in combination, a meter movement having a rotational axis, and a scale, a meter pointer supported on and moved by said meter movement, said meter pointer including a portion extending forwardly from said meter movement and adapted to traverse and indicate over the full scale, and said meter pointer including a portion extending rearwardly from said meter movement, said rearwardly extending portion being aligned and movable wtih said forwardly extending portion, a vane fixed on said rearwardly extending portion and said vane being elongated in a direction generally perpendicular to the longitudinal axis of said rearwardly and forwardly extending portions of said meter pointer, and a pair of set point arm assemblies pivotally mounted at the rotational axis of said meter movement and independently movable with respect to each other and to said meter pointer, each set point arm assembly having a forwardly extending portion terminating adjacent said scale for manual adjustments to predetermined points on the scale, and each set point arm assembly including a rearwardly extending portion movable with its forwardly extending portion, the rearwardly extending portions of each set point assembly being offset with respect to the longitudinal axis of its forwardly extending portion, and one rearwardly extending portion being offset in one direction and the other rearwardly extending portion being offset in the opposite direction, a pair of spaced electromagnetically coupled coils being mounted on the rearwardly extending portions of each set point arm assembly positioned for the travel of said vane between each pair of coils, the offset of said rearwardly extending portion of each set point arm assembly relative to each forwardly extending portion thereof and the dimensions of the vane being such that the vane will be positioned between one pair of coils until its respective set arm is reached by the meter pointer whereupon the vane will move from between said pair of coils and will be positioned between the other pair of coils when its respective set arm is reached by the meter pointer and remain therebetween while the meter pointer travels full scale.

3. A control meter in accordance with claim 2, wherein the offset of each rearwardly extending portion of each set point arm assembly relative to its respective forwardly extending portion is at an angle equal to one-half the arc of the scale and the length of said vane is such that the vane will cover the area as described by an arc from the rotational axis which is equal to the scale arc.

References Cited by the Examiner
UNITED STATES PATENTS

| | | |
|---|---|---|
| 2,286,820 | 6/1942 | Lenehan. |
| 2,802,987 | 8/1957 | Wolferz _____ 324—125 |
| 2,810,526 | 10/1957 | Rogers _____ 219—506 X |
| 2,898,436 | 8/1959 | Lawler _____ 219—497 |
| 3,005,166 | 10/1961 | Savory _____ 219—500 X |
| 3,114,089 | 12/1963 | Mulligan _____ 324—99 X |

WALTER L. CARLSON, *Primary Examiner.*
FREDERICK M. STRADER, *Examiner.*
R. V. ROLINEC, *Assistant Examiner.*